United States Patent [19]

Yoshida et al.

[11] Patent Number: 4,892,848

[45] Date of Patent: Jan. 9, 1990

[54] SILICON NITRIDE SINTERED BODY AND PROCESS FOR PREPARATION THEREOF

[75] Inventors: Makoto Yoshida; Kiyoshi Yokoyama, both of Kokubu, Japan

[73] Assignee: Kyocera Corporation, Kyoto, Japan

[21] Appl. No.: 891,854

[22] Filed: Jul. 29, 1986

[30] Foreign Application Priority Data

Jul. 30, 1985 [JP] Japan ................. 60-169177

[51] Int. Cl.$^4$ ............................. C04B 35/58
[52] U.S. Cl. ........................... 264/65; 264/66; 501/97; 501/96
[58] Field of Search ............. 501/96, 97; 264/65, 264/60

[56] References Cited

U.S. PATENT DOCUMENTS

| | | | |
|---|---|---|---|
| 3,811,928 | 5/1974 | Henney et al. | 501/97 |
| 4,004,937 | 1/1977 | Masaki | 501/97 |
| 4,280,850 | 7/1981 | Smith et al. | 501/97 |
| 4,327,187 | 4/1982 | Komatsu et al. | 501/97 |
| 4,356,136 | 10/1982 | Mangels | 264/65 |
| 4,499,192 | 2/1985 | Shimamori et al. | 501/97 |
| 4,603,116 | 7/1980 | Smith et al. | 501/97 |
| 4,615,990 | 10/1986 | Richon et al. | 501/97 |

FOREIGN PATENT DOCUMENTS

| | | | |
|---|---|---|---|
| 79678 | 5/1983 | European Pat. Off. | 501/97 |
| 2621523 | 11/1976 | Fed. Rep. of Germany | 501/97 |
| 55-116677 | 9/1980 | Japan | 501/96 |
| 57-61671 | 4/1982 | Japan | 501/97 |
| 58-91147 | 5/1983 | Japan | 501/97 |
| 58-145676 | 8/1983 | Japan . | |
| 59-39769 | 3/1984 | Japan | 501/97 |
| 60-131865 | 7/1985 | Japan | 501/97 |
| 60-155576 | 8/1985 | Japan | 501/97 |
| 60-171208 | 9/1985 | Japan | 501/97 |

*Primary Examiner*—Mark L. Bell
*Assistant Examiner*—David M. Brunsman
*Attorney, Agent, or Firm*—Spensley Horn Jubas & Lubitz

[57] ABSTRACT

Disclosed is a process for the preparation of a silicon nitride sintered body, which comprises steps of (i) molding a composition comprising (a) 87 to 98% by weight of silicon nitride and (b) 2 to 13% by weight of a sintering aid comprising an oxide or nitride of aluminum or an element of the group IIIa of the Periodic Table and an inorganic oxide capable of forming a liquid phase component having a melting point lower than that of silicon nitride, the inorganic oxide being present in an amount of 1 to 7% by weight based on the composition, (ii) sintering the molded body in a nitrogen atmosphere at a temperature forming a liquid phase containing said liquid phase component having a low melting point, and (iii) heat-treating the resulting sintered body in a nitrogen atmosphere at a temperature higher than the sintering temperature to volatilize the liquid phase component having a low melting point from the liquid phase.

In the obtained sintered body, the oxygen content in the surface layer is controlled below 3% by weight, and the flexural strength at 1300° C. of the surface layer is higher than that of the inner portion.

16 Claims, 5 Drawing Sheets

SILICON NITRIDE SINTERED BODY AND PROCESS FOR PREPARATION THEREOF

BACKGROUND OF THE INVENTION (1) Field of the Invention

The present invention relates to a silicon nitride sintered body and a process for the preparation thereof. More particularly, the present invention relates to a silicon nitride sintered body which is excellent in strength and creep resistance at high temperatures and a process for the preparation thereof.

(2) Description of the Prior Art

A sintered body composed of silicon nitride has mainly covalent bonds as the bonding manner of atoms and is excellent in strength, hardness and thermal and chemical stability. Accordingly, this sintered body has been used in engineering ceramics especially for a heat engine such as a gas turbine engine.

It is considered that with recent increases in the efficiency of heat engines, the operation temperature will be elevated to 1400° C. or higher, and development of a material capable of being used under such high temperature conditions is desired.

As the sintering methods for the production of silicon nitride, there have been adopted a hot press method and an atmospheric pressure sintering method, and a gas pressure sintering method is recently examined.

In these methods, it has been intended to leave the added composition in the vitrious phase or crystal phase of the grain boundary or in the solid state dissolved in the crystal phase without decomposition after sintering.

However, if the added composition is thus left in the sintered body, this results in changes in excellent characteristics owing to peculiar covalent bonds of silicon nitride, such as high strength and creep resistance at high temperatures. Namely, when a sintering aid composed mainly of an oxide is added, the sintering aid reacts with silicon nitride and a metal compound composed mainly of an oxide and/or nitride of silicon is formed. This oxide and/or nitride promotes densification at the sintering step and improves the sintering property. However, since the oxide and/or nitride per se has a strong ionic bonding property, the oxide and/or nitride is likely to degrade characteristics of the sintered body at high temperatures.

As means for eliminating this disadvantage of the silicon nitride sintered body, there has been developed a DuO-density rotor by joining an inner portion (central portion) of a part to be exposed to severe application conditions, such as a rotor of a gas turbine engine, which is composed of hot-pressed silicon nitride, with an outer portion composed of reaction-sintered silicon nitride.

According to this proposal, the outer portion to be exposed to an oxidative atmosphere at a high temperature close to 1400° C. is formed of a material excellent in oxidation resistance and the inner portion which is maintained at a low temperature but is subject to a large centrifugal force and connected to a shaft is formed of a material having a high strength.

This method is not practical because the manufacturing cost of the sintered body is large and the productivity is low, and the method is not suitable for mass production.

Moreover, the step of joining sintered bodies is necessary and precise joining is required, and therefore, the preparation process is complicated.

SUMMARY OF THE INVENTION

Through research with a view to overcoming the foregoing defects, it was found that if a part of the liquid phase component formed in the sintered body is volatilized, the oxygen content in the surface layer of the sintered body can be controlled to a low level, whereby a silicon nitride sintered body excellent in oxidation resistance, strength and creep resistance can be obtained.

It is therefore a primary object of the present invention to provide a silicon nitride sintered body which is excellent in strength, oxidation resistance and creep resistance at high temperatures, and a process for the preparation of this sintered body.

Another object of the present invention is to provide a silicon nitride sintered body valuable for a part used at high temperatures, such as a gas turbine, and a process for the preparation of this sintered body.

In accordance with one fundamental aspect of the present invention, there is provided a process for the preparation of a silicon nitride sintered body, which comprises steps of (i) molding a composition comprising (a) 87 to 98% by weight of silicon nitride and (b) 2 to 13% by weight of a sintering aid comprising an oxide or nitride of aluminum or an element of the group IIIa of the Periodic Table and an inorganic oxide capable of forming a liquid phase component having a melting point lower than that of silicon nitride, the inorganic oxide being present in an amount of 1 to 7% by weight based on the composition, (ii) sintering the molded body in a nitrogen atmosphere at a temperature forming a liquid phase containing said liquid phase component having a low melting point, and (iii) heat-treating the resulting sintered body in a nitrogen atmosphere at a temperature higher than the sintering temperature to volatilize the liquid phase component having a low melting point from the liquid phase.

In accordance with another fundamental aspect of the present invention, there is provided a silicon nitride sintered body formed by molding and sintering a composition comprising silicon nitride and a sintering aid, wherein the surface layer of the sintered body has an oxygen content lower than 3% by weight based on the surface layer and the sintered body has such strength characteristics that the flexural strength as measured at 1300° C. of the surface layer is higher than that of the inner phase.

DETAILED DESCRIPTION OF THE PREFERRED EMBODIMENTS

Figure 1:
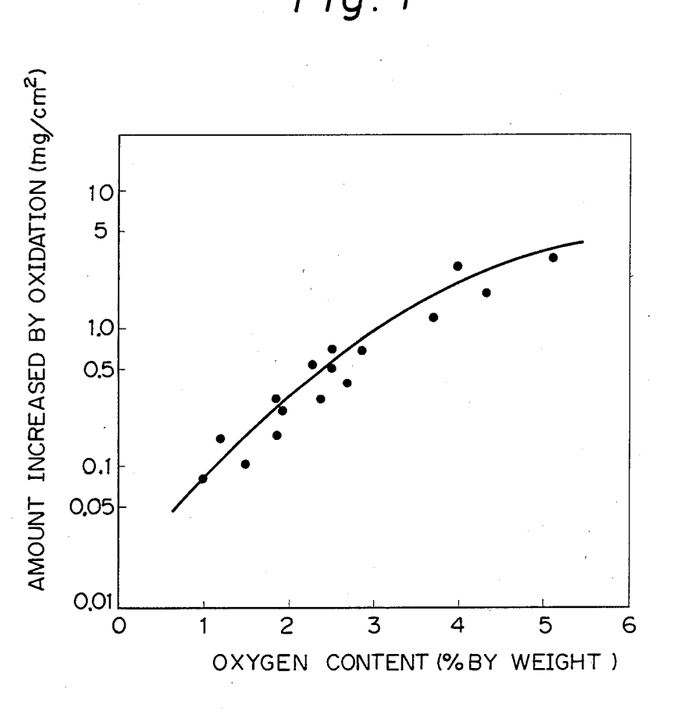
FIG. 1 is a diagram illustrating the relation between the oxygen content in a surface layer of a silicon nitride sintered body and the amount increased by oxidation at 1400° C.

We confirmed that when a silicon nitride sintered body is used at high temperatures, mechanical characteristics depend greatly on the composition of the surface phase and the states of the crystal phase and grain boundary phase and are especially influenced by the oxygen content in the composition of the surface phase. Accordingly, we noted the amount increased by oxidation at 1400° C. for 24 hours in open air as the criterion indicating degradation of properties, and the relation between the oxygen content in the surface of the sintered body and the amount increased by oxidation was examined. The obtained results are shown in FIG. 1. From FIG. 1, it apparent that the higher is the oxygen content, the larger is the amount increased by oxidation. That is, it is considered that a higher oxygen content results in degradation of properties.

According to the present invention, by controlling the oxygen content in the surface layer of the sintered body to below 3% by weight, especially 2.5% by weight, as is apparent from the example described hereinafter, the amount increased by oxidation can be reduced below 1 mg/cm$^2$ even at a high temperature of 1400° C., and the strength of the surface layer can be maintained at a level of at least 60 kg/mm$^2$. Accordingly, even if the sintered body of the present invention is used for a turbine or the like, excellent oxidation resistance and high creep-resistant strength can be attained.

In the silicon nitride sintered body of the present invention, the inner phase has a higher flexural strength than that of the surface layer at room temperature, but at 1300° C., the surface layer has a higher flexural strength than that of the inner phase.

In connection with the preparation of the sintered body of the present invention, since the oxygen content is determined by the composition of the starting powder and the sintering conditions as described hereinbefore, it is considered that good results will be obtained by reducing the amount of the oxide in the starting powder to a minimum level. However, a part of the oxide reacts with silicon nitride at the sintering step to form a vitrious oxide and/or nitride in the grain boundary and exerts a function of promoting sintering and densification by dissolution and precipitation of silicon nitride to improve the sintering property. Therefore, the oxide is indispensable for sintering.

Accordingly, reduction of the amount added of the oxide induces a fatal defect of degradation of the sintering property and therefore, reduction of the amount added of the oxide is not preferred.

As the result of research, it was found that if an inorganic oxide capable of forming a liquid phase component having a melting point lower than that of silicon nitride is incorporated in the starting powder, sintering is advanced while maintaining a sufficient liquid phase and the liquid phase component having a low melting point is volatilized after completion of sintering, then the substantial oxygen content in the sintered body can be reduced.

In the present invention, the composition of the starting powder is one factor determining the oxygen content of the sintered body as the final product. It is required that the low-melting-point liquid phase component should have a melting point lower than that of silicon nitride as pointed out hereinbefore and should have a higher vapor pressure under a certain pressure, and that the liquid phase component should act as a sintering aid. As the inorganic oxide capable of forming this low-melting-point liquid phase, there can be mentioned $SiO_2$, $MgO$, $WO_3$, $MoO_3$, $B_2O_3$, $SrO$, $TiO_2$, $CaO$ and $Li_2O$, and $SiO_2$ is especially preferred. Since a part or all of $SiO_2$ is inevitably contained in the starting silicon nitride, it is natural that the inorganic oxide may be $SiO_2$.

Since only the inorganic oxide capable of forming the above-mentioned low-melting-point liquid phase component is incorporated into the starting silicon nitride, the action of the inorganic oxide as the sintering aid is insufficient. Accordingly, the inorganic oxide is used in combination with at least one other sintering aid, that is, an oxide or nitride of aluminum or an element of the group IIIa of the Periodic Table. As the sintering aid of this type, $Y_2O_3$, $Al_2O_3$ and lanthanide type oxides and nitrides are preferably used.

$\alpha$-$Si_3N_4$ is most preferred as the starting silicon nitride, and silicon nitride having an $\alpha$-$Si_3N_4$ content of at least 85% by weight is advantageously used. Inclusion of silicon oxide in an amount satisfying the above requirement in the starting silicon nitride is allowed.

In the present invention, a composition comprising 87 to 98% by weight, especially 90 to 95% by weight, of silicon nitride and 2 to 13% by weight, especially 5 to 10% by weight, of a sintering aid is used as the starting material. If the amount of the sintering aid is smaller than 2% by weight, sintering is insufficient, and if the amount of the sintering aid exceeds 13% by weight, sintering is sufficiently advanced but the strength is drastically reduced. Furthermore, if the amount of the sintering aid exceeds 13% by weight, the oxygen content in the surface layer in the sintered body exceeds the range specified in the present invention or the surface layer is rendered porous by decomposition of silicon nitride.

The amount of the inorganic oxide forming a low-melting-point liquid phase component is generally 1 to 7% by weight and especially 2 to 5% by weight based on the total composition. If the amount of the inorganic oxide is too small and below the above range, the process is not practical from the industrial viewpoint and the object of sufficiently advancing sintering at a relatively low temperature is hardly attained. If the amount of the inorganic oxide is too large and exceeds the above range, the sintering property is degraded and the strength of the sintered body is reduced, and in this case, even if the means of the present invention is used, the oxygen concentration in the surface layer of the sintered body can hardly be controlled within the range specified in the present invention.

The above-mentioned means of the present invention will now be described in detail. A mixed powder of the sintering aid containing the inorganic oxide and a fine powder of silicon nitride is molded into a desired shape by known methods such as press molding, cast molding, extrusion molding and injection molding, and the molded body is transferred to the sintering step.

The sintering temperature at the sintering step is set at such a level that by the reaction of the inorganic oxide with the oxide or silicon nitride contained in the fine powder of silicon nitride, a silico-oxide having a melting point lower than that of silicon nitride is formed and is present as the liquid phase component.

This sintering temperature is appropriately set according to the kind of the inorganic oxide used. In order to sufficiently advance sintering, the sintering temperature is ordinarily set at a level of 1650° C. or higher. If the sintering temperature is lower than 1650° C., the liquid phase is not sufficiently formed and it becomes difficult to advance sintering sufficiently. It is preferred that sintering be carried out in a non-oxidizing atmosphere, especially in a nitrogen atmosphere, under a pressure higher than the thermodynamic equilibrium pressure of silicon nitride. Incidentally, in order to control volatilization of the low-melting-point liquid phase component to a low level, it is preferred that the sintering temperature at this step be not higher than 1800° C. In view of the foregoing two factors, it is preferred that the sintering temperature be 1650° to 1800° C. The sintering time is not particularly critical, but it is preferred that the sintering time be 1 to 10 hours.

It is found that at this sintering step, the oxygen content in the surface layer exceeds 3% by weight with advance of sintering. The reason is considered to be that as the internal structure is densified with advance of sintering, the liquid phase component having a low melting point migrates to the surface portion.

According to the present invention, the sintered body is heat-treated in a nitrogen atmosphere at a temperature higher than the sintering temperature adopted at the sintering step (ii), whereby the low-melting-point liquid phase component in the liquid phase is volatilized. This heat treatment step (iii) may be conducted at a place different from the place where the sintering step (ii) is conducted. In general, after completion of sintering at the sintering step, the sintered body is transferred to the step of volatilizing the liquid phase component. At this step, volatilization is effected by elevating the temperature from the sintering temperature adopted at the sintering step. The low-melting-point liquid phase component formed at the sintering step is decomposed and evaporated by elevation of the temperature and is volatilized in the form of an oxide. The temperature at the volatilizing step is set so that thermal decomposition of silicon nitride or abnormal growth of grain is not caused and volatilization is sufficiently advanced. It is preferred that the volatilization temperature be set at 1900° to 2000° C.

In the present invention, since the vapor pressure of the low-melting-point liquid phase component is high, if the atmosphere gas at the time of completion of sintering, that is, the nitrogen gas, is always substituted forcibly to reduce the vapor pressure of the liquid phase component in the atmosphere, volatilization is further promoted and good results can be obtained.

Substitution of the atmosphere gas may be effected simultaneously with elevation of the temperature or at the time of lowering of the temperature.

By the above-mentioned step of volatilizing the low-melting-point liquid phase component, the concentration of the oxide per se in the sintered body is reduced, and therefore, the oxygen content in the sintered body can be reduced.

At the above-mentioned volatilizing step, vaporization of the low-melting-point liquid phase component starts at the surface phase of the sintered body and advances into the inner layer. Accordingly, in the sintered body as the final product, a continuous gradient of the oxide content is formed from the inner phase to the surface phase in the sintered body according to the required time of the volatilizing step or the shape of the sintered body, and therefore, a continuous gradient of the oxygen concentration is formed. Of course, if the volatilizing step is conducted for a long time, a sintered body in which the oxygen content is uniform in the inner phase and surface phase will be obtained. However, if the amount of the volatilized low-melting-point liquid phase component is adjusted so that the oxygen content in the surface phase is lower than 3% by weight, the sintered body exerts excellent strength, corrosion resistance and creep resistance when used at high temperatures.

The sintered body obtained according to the present invention has a composition gradient in which the oxygen content is gradually reduced from the inner phase to the surface phase according to the time required for the volatilizing step and the like factors, as described above.

This tendency is especially effective for a structure of, for example, a rotor of a gas turbine, the surface layer of which is exposed to a high-temperature oxidative atmosphere while a high strength is required for the inner layer. Namely, the lower the oxygen content, the higher is the strength at high temperature, and the higher the oxygen content, the higher the toughness and mechanical strength at low temperatures.

This feature will now be described with reference to a rotor as an example. In principle, the rotor comprises a thick support to which a shaft is fixed and a plurality of thin vanes radially extended from the support. In the case where a sintered body having such a configuration is obtained according to the present invention, a powdery mixture having the above-mentioned composition is molded into a shape of a rotor, and the molded body is subjected to the sintering and volatilizing operations. At the volatilizing step, volatilization is advanced from the surface phase. Since the vanes of the rotor have a small thickness and have a larger area (surface area) to be contacted with the atmosphere than the support, volatilization is more readily caused at the volatilizing step in the vanes. Accordingly, if the volatilization is stopped when the oxygen content in the entire vanes becomes lower than 3% by weight, there can be obtained a rotor having such a composition gradient that the oxygen content is gradually increased toward the support from the vanes. Since the oxygen content is low in the vanes for which high strength and oxidation resistance at high temperature are required, this requirement is sufficiently satisfied, and since the oxygen content is high in the support for which a high strength at relatively low temperatures is required, a high strength can be obtained in the support. Accordingly, a sintered body in which different characteristics are required for respective parts can be integrally formed by one sintering step without performing the joining operation as required in the conventional technique. Moreover, since the composition is changed with a continuous gradient, an excellent strength can be exerted against an external shock and a rotor having a good performance stability and being suitable for the mass production can be obtained.

The present invention will now be described in detail with reference to the following example that by no means limits the scope of the invention.

EXAMPLE

Figure 2A:
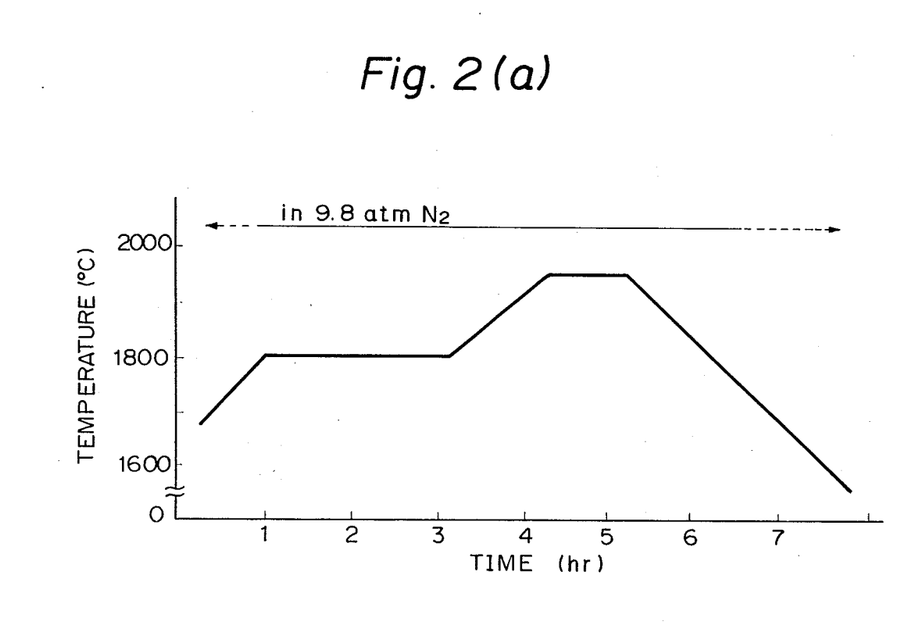
FIG. 2 is a diagram showing heat treatment patterns (a), (b) and (c) adopted in the example described hereinafter.
Figure 2B:
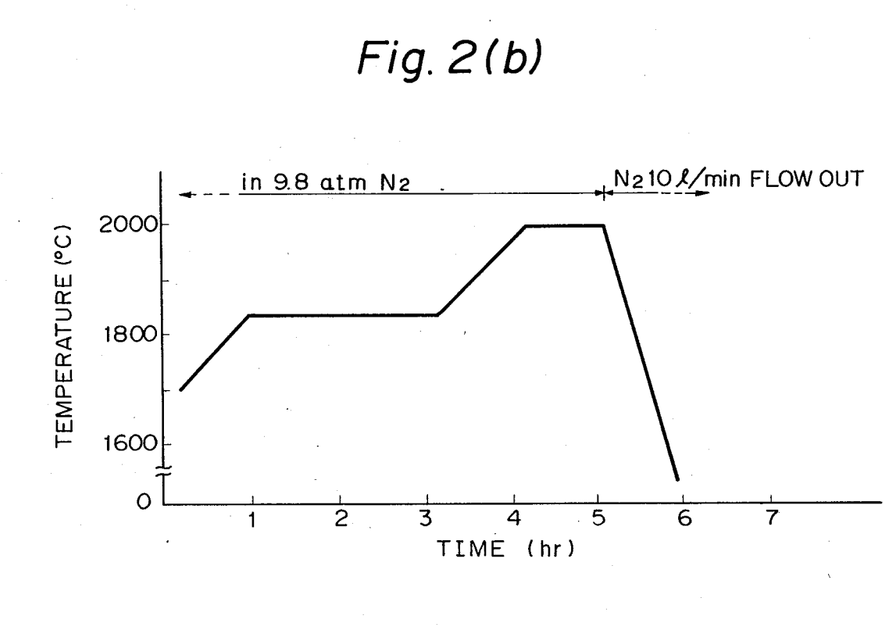
Figure 2C:
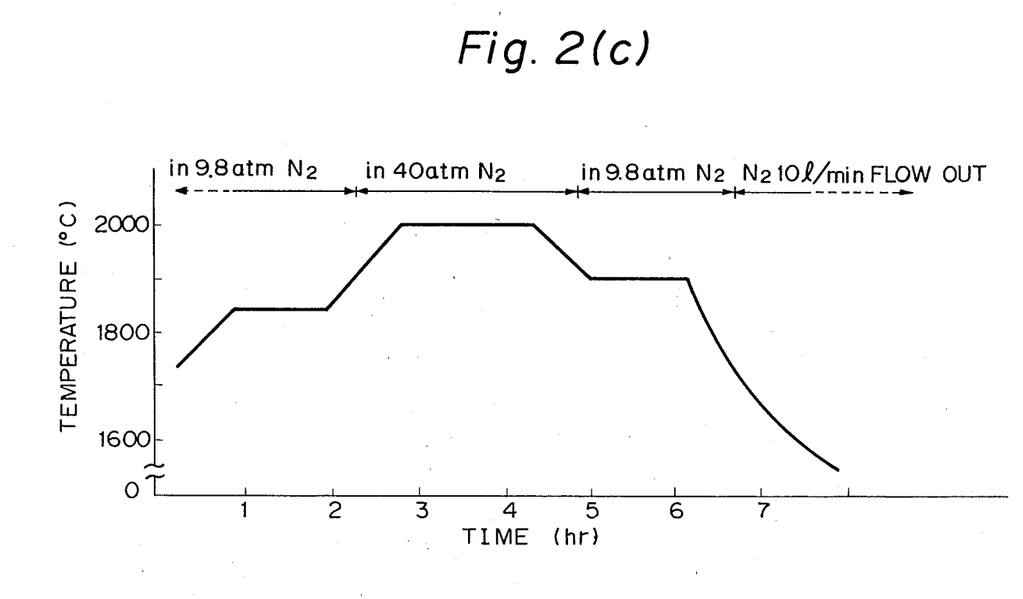

Finely divided silicon nitride, an inorganic oxide and other sintering aid were mixed according to a composition shown in Table 1, and the mixture was molded under a pressure of 1 ton/cm$^2$ by a mold press into a molded body having a size of 30 mm×30 mm×50 mm. The molded body was sintered under a sintering condition as shown in any of FIGS. 2-(a) through 2-(c). Incidentally, as the fine powder of silicon nitride, one having an oxygen content of 2.2 to 2.3% by weight calculated as $SiO_2$ was used.

Figure 3:
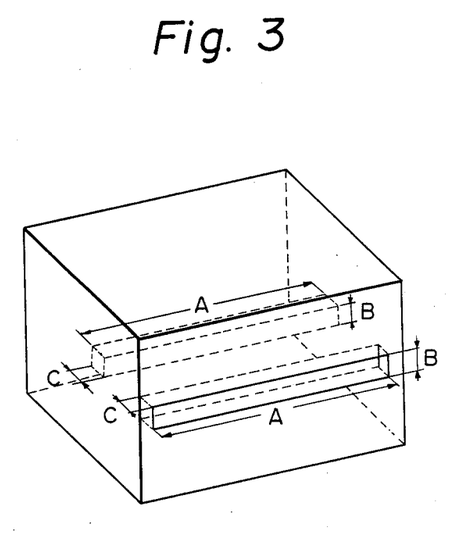
FIG. 3 is a perspective view illustrating a method for cutting out specimens used for testing silicon nitride sintered bodies.

According to the method shown in FIG. 3, test pieces having a width (A) of 45 mm, a length (B) of 4 mm and a depth (C) of 3 mm were cut out from the surface layer and the inner phase portion including the central part. The characteristics were determined according to the following procedures.

The strength was measured at room temperature and at 1300° C. accoding to the 4-point bending method of JIS R-1601. The test piece for the flexural strength test was allowed to stand still in open air at 1400° C. for 24 hours, and the weight increase per unit area was measured and designated as the amount increased by oxidation at 1400° C. The cut-out test piece was strongly heated in a graphite crucible, formed CO formed as gas was oxidized to $CO_2$ by an oxidant, and the $CO_2$ gas was analyzed by an infrared spectrometer to determine the oxygen content. The obtained results are shown in Table 1.

body of Run No. 12 (where the amount of the sintering aid was larger than 13% by weight) and the sintered body of Run No. 13 where the amount of the inorganic oxide capable of forming a low-melting-point liquid phase component was larger than 7% by weight, decomposition occurred and the strength was extremely low.

On the other hand, in each of the sintered bodies of Runs No. 1 through No. 10 according to the present invention, the flexural strength at room temperature was higher than 85 kg/mm$^2$ in the inner phase and higher than 65 kg/mm$^2$ in the surface layer and the flexural strength at 1300° C. was higher than 50 kg/mm$^2$ in the inner phase and higher than 60 kg/mm$^2$ in the surface layer, and the amount increased by oxidation could be controlled to below 1.0 mg/cm$^2$ in the outer phase.

As is apparent from the foregoing description, ac-

TABLE 1

| Run No. | Starting Composition (% by weight) | | | | | | Sintering Condition | Flexural Strength (kg/mm$^2$) at Room Temperature | |
|---|---|---|---|---|---|---|---|---|---|
| | $Si_3N_4$ | Amount of $SiO_2$ in $Si_3N_4$** | Externally added Inorganic Oxide | | Other Sintering Aid | | | Inner Phase | Surface Layer |
| 1 | 88.0 | 2.0 | 2 | $SiO_2$ | 5 | $Y_2O_3$ | (a) | 103 | 75 |
| | | | | | 3 | $Al_2O_3$ | | | |
| 2 | 89.9 | 2.1 | 1 | $SiO_2$ | 5 | $Y_2O_3$ | (a) | 95 | 78 |
| | | | | | 2 | $Al_2O_3$ | | | |
| 3 | 92.8 | 2.2 | 1 | $SiO_2$ | 3 | $Y_2O_3$ | (a) | 110 | 76 |
| | | | | | 1 | $Al_2O_3$ | | | |
| 4 | 92.8 | 2.2 | 1 | $B_2O_3$ | 3 | $Y_2O_3$ | (a) | 115 | 85 |
| | | | | | 1 | $Al_2O_3$ | | | |
| 5 | 92.8 | 2.2 | 1 | MgO | 4 | $Y_2O_3$ | (b) | 98 | 65 |
| 6 | 91.9 | 2.1 | 2 | $SiO_2$ | 2 | $Y_2O_3$ | (c) | 87 | 77 |
| | | | 2 | SrO | | | | | |
| 7 | 88.0 | 2.0 | 2 | $TiO_2$ | 5 | YN | (a) | 88 | 71 |
| | | | | | 3 | $Y_2O_3$ | | | |
| 8 | 92.8 | 2.2 | 1 | $SiO_2$ | 4 | $Y_2O_3$ | (b) | 90 | 72 |
| 9 | 91.9 | 2.1 | 1 | $SiO_2$ | 5 | $Y_2O_3$ | (b) | 95 | 69 |
| 10 | 92.8 | 2.2 | 2 | $SiO_2$ | 3 | $Y_2O_3$ | (b) | 88 | 66 |
| 11* | 88.0 | 2.0 | 2 | $SiO_2$ | 5 | $Y_2O_3$ | 1800° C. 2 atm, 2 Hr | 95 | 93 |
| | | | | | 3 | $Al_2O_3$ | | | |
| 12* | 85.1 | 1.9 | 5 | $SiO_2$ | 5 | $Y_2O_3$ | (a) | 65 | 51 |
| | | | | | 3 | $Al_2O_3$ | | | |
| 13* | 88.0 | 2.0 | 6 | $SiO_2$ | 3 | $Y_2O_3$ | (a) | 36 | 38 |
| | | | | | 1 | $Al_2O_3$ | | | |

| Run No. | Flexural Strength (kg/mm$^2$) at 1300° C. | | Oxygen Content (% by weight) in Surface Layer | Amount (mg/cm$^2$) Increased by Oxidation | |
|---|---|---|---|---|---|
| | Inner Phase | Surface Layer | | Inner Phase | Surface Layer |
| 1 | 54 | 70 | 2.5 | 3.0 | 0.8 |
| 2 | 60 | 76 | 2.3 | 1.9 | 0.6 |
| 3 | 65 | 79 | 2.0 | 1.0 | 0.2 |
| 4 | 61 | 69 | 2.4 | 0.9 | 0.3 |
| 5 | 58 | 70 | 1.9 | 0.9 | 0.25 |
| 6 | 51 | 61 | 1.8 | 0.5 | 0.3 |
| 7 | 51 | 63 | 1.8 | 0.7 | 0.2 |
| 8 | 50 | 63 | 1.7 | 0.3 | 0.15 |
| 9 | 53 | 73 | 2.0 | 0.5 | 0.2 |
| 10 | 55 | 61 | 1.9 | 0.2 | 0.15 |
| 11* | 35 | 41 | 5.1 | 3.5 | 3.1 |
| 12* | 25 | 18 | conspicuous decomposition | 5.0 | 5.1 |
| 13* | 20 | 13 | conspicuous decomposition | — | — |

Note
*outside the scope of the present invention
**the oxygen content in the fine powder of silicon nitride as calculated as $SiO_2$ From the results shown in Table 1, the following can be seen.

In the sintered body of Run No. 11 formed from the composition within the scope of a present invention but not subjected to the volatilizing treatment, the liquid phase component was not volatilized, and the flexural strength at 1300° C. was insufficient and the amount increased by oxidation was large. In both the sintered cording to the present invention, by volatilizing a liquid phase component having a low melting point to reduce the oxygen content in the sintered body and set the oxygen content in the surface layer below 3% by weight, there can be obtained a silicon nitride sintered body excellent in corrosion resistance, strength and creep resistance. Furthermore, according to the process of the present invention, a sintered body in which different characteristics are required for respective parts, such as a rotor for a gas turbine, can be conveniently prepared because the characteristics can be changed within one sintering schedule by a continuous composition gradient (oxygen content gradient). Therefore, the preparation steps can be simplified and the productivity can be increased.

We claim:

1. A process for preparation of a silicon nitride sintered body, which process comprises (i) molding a composition comprising (a) 87 to 98% by weight of silicon nitride and (b) 2 to 13% by weight of a sintering aid, said sintering aid comprising an oxide or nitride of aluminum or other element of group IIIa of the Periodic Table and an inorganic oxide capable of forming a liquid phase component having a melting point lower than that of silicon nitride, the inorganic oxide being present in an amount of 1 to 7% by weight based on the composition, thereby forming a molded body; (ii) sintering the molded body in a nitrogen atmosphere at a first temperature within the range of 1650° and 1800° C. and sufficient to form a liquid phase comprising said liquid phase component, thereby forming a sintered body; and (iii) heat-treating the sintered body in a nitrogen atmosphere at a second temperature within the range of 1900° and 2000° C. and sufficient to volatilize the liquid phase component, thereby forming a final product having a surface layer and an inner phase, said heat-treating being carried out so that oxygen content of the surface layer of the final product is lower than 3% by weight.

2. A process according to claim 1, wherein the sintering aid comprises said inorganic oxide and an oxide or nitride of an element of the group IIIa of the Periodic Table.

3. A process according to claim 1, wherein the inorganic oxide is $SiO_2$, MgO, $WO_3$, $MoO_3$, $B_2O_3$, SrO, $TiO_2$, CaO or $Li_2O$.

4. A process according to claim 1, wherein the inorganic oxide is $SiO_2$ contained in silicon nitride as an impurity.

5. A process according to claim 2, wherein the oxide of the element of the group IIIa of the Periodic Table is yttria.

6. A process according to claim 1, wherein said sintering is carried out under a pressure higher than thermodynamic equilibrium pressure of silicon nitride.

7. A process according to claim 1, wherein said heat-treating is carried out subsequently to said sintering by elevating the temperature in situ.

8. A process for preparation of a silicon nitride sintered body, which process comprises (i) molding a composition comprising (a) 87 to 98% by weight of silicon nitride and (b) 2 to 13% by weight of a sintering aid, said sintering aid comprising an oxide or nitride of aluminum or other element of group IIIa of the Periodic Table and an inorganic oxide capable of forming a liquid phase component having a melting point lower than that of silicon nitride, the inorganic oxide being present in an amount of 1 to 7% by weight based on the composition, thereby forming a molded body; (ii) sintering the molded body in a nitrogen atmosphere at a first temperature within the range of 1650° and 1800° C. and sufficient to form a liquid phase comprising said liquid phase component, thereby forming a sintered body; and (iii) heat-treating the sintered body in a nitrogen atmosphere at a second temperature within the range of 1900° and 2000° C. while forcibly substituting nitrogen gas in the atmosphere to maintain vapor pressure of the liquid phase component in the atmosphere at a low level to form a final product, whereby volatilization of the liquid phase component is promoted.

9. A process according to claim 8, wherein the inorganic oxide is $SiO_2$, MgO, $WO_3$, $MoO_3$, $B_2O_3$, SrO, $TiO_2$, CaO or $Li_2O$.

10. A process according to claim 8, wherein the inorganic oxide is $SiO_2$ contained in silicon nitride as an impurity.

11. A process according to claim 1, wherein the oxygen content of the surface layer of the final product is 2.5% by weight or less.

12. A process according to claim 1, wherein said composition comprises 90 to 95% by weight of silicon nitride.

13. A process according to claim 8, wherein said composition comprises 90 to 95% by weight of silicon nitride.

14. A process according to claim 1, wherein said inorganic oxide comprises 2 to 5% by weight of said composition.

15. A process according to claim 8, wherein said inorganic oxide comprises 2 to 5% by weight of said composition.

16. A process for preparation of a silicon nitride sintered body, which process comprises (i) molding a composition comprising (a) silicon nitride and (b) 2 to 13% by weight of a sintering aid, said sintering aid comprising an oxide or nitride of an element of group IIIa of the Periodic Table and an inorganic oxide capable of forming a liquid phase component having a melting point lower than that of silicon nitride, the inorganic oxide being present in an amount of up to 7% by weight base on the composition, thereby forming a molded body; (ii) sintering the molded body in a non-oxidizing atmosphere at a first temperature within the range of 1650° and 1800° C. and sufficient to form a liquid phase comprising said liquid phase component, thereby forming a sintered body; and (iii) heat-treating the sintered body in a non-oxidizing atmosphere at a second temperature within the range of 1900° and 2000° C., whereby volatilization of the liquid phase component is promoted, said heat-treating being carried out (1) while forcibly substituting non-oxidizing gas in the atmosphere to maintain vapor pressure of the liquid phase component in the atmosphere at a low level to form a final product or (2) so that oxygen content of the surface layer of the final product is lower than 3% by weight.

* * * * *